Figure 1:
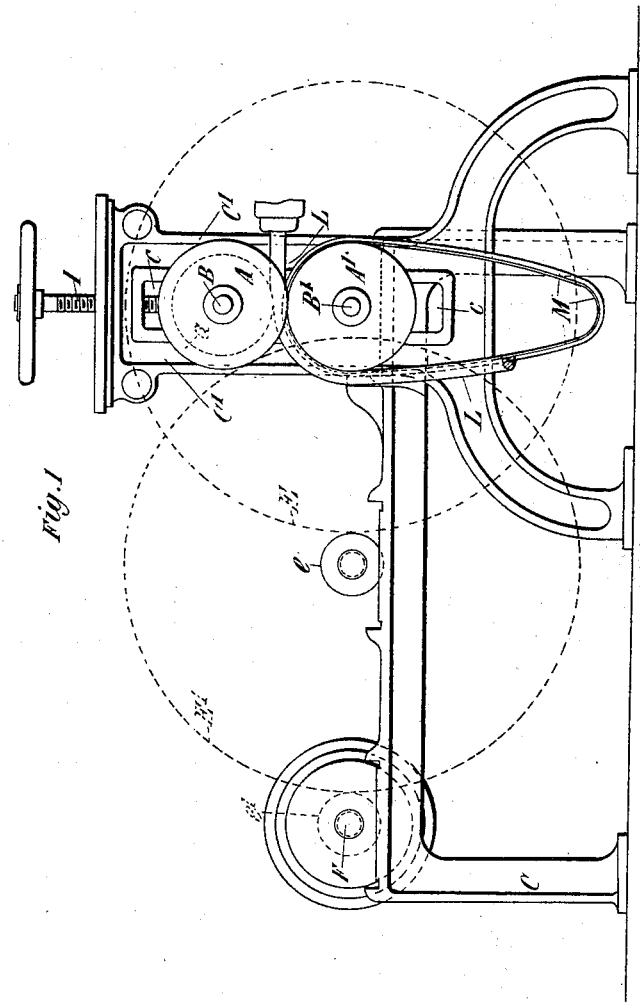

No. 622,774. Patented Apr. 11, 1899.
J. M. MacLULICH.
METHOD OF MANUFACTURING INDIA RUBBER OR OTHER ENDLESS BANDS OR STRIPS.
(Application filed Oct. 4, 1898.)
(No Model.) 3 Sheets—Sheet 1.

Witnesses: Raphael Netter, Benjamin Miller
James Mecredy MacLulich, Inventor
by Kerr, Page & Cooper Attys.

No. 622,774. Patented Apr. 11, 1899.
J. M. MacLULICH.
METHOD OF MANUFACTURING INDIA RUBBER OR OTHER ENDLESS BANDS OR STRIPS.
(Application filed Oct. 4, 1898.)
(No Model.) 3 Sheets—Sheet 2.

Witnesses:
Raphaël Netter
Benjamin Miller

James Mecredy MacLulich, Inventor.
by Ken. Page & Cooper Attys.

No. 622,774. Patented Apr. 11, 1899.
J. M. MacLULICH.
METHOD OF MANUFACTURING INDIA RUBBER OR OTHER ENDLESS BANDS OR STRIPS.
(Application filed Oct. 4, 1898.)
(No Model.) 3 Sheets—Sheet 3.

Witnesses:
Raphaël Netter
Benjamin Miller

James Mecredy MacLulich,
Inventor
by Kerr, Page & Cooper Attys.

UNITED STATES PATENT OFFICE.

JAMES MECREDY MacLULICH, OF DUNDRUM, IRELAND.

METHOD OF MANUFACTURING INDIA-RUBBER OR OTHER ENDLESS BANDS OR STRIPS.

SPECIFICATION forming part of Letters Patent No. 622,774, dated April 11, 1899.

Application filed October 4, 1898. Serial No. 692,599. (No model.)

*To all whom it may concern:*

Be it known that I, JAMES MECREDY MAC-LULICH, a subject of the Queen of Great Britain, residing at Gortmore, Dundrum, in the county of Dublin, Ireland, have invented an Improved Method of Manufacturing India-Rubber or other Endless Bands or Strips, of which the following is a specification.

This invention relates to an improved method of manufacturing endless or continuous bands or strips of the kind that have hitherto been made by a molding operation, my chief object being to render the manufacture both less expensive and more expeditious than heretofore. The said endless bands or strips are especially intended for use with or as tires for wheels, although they may be utilized for any other purpose for which they may be appropriate. I may apply my invention to the manufacture of tubes by making the endless bands or strips of great width as compared with their diameter. The bands may be of any desired shape in cross-section.

An important feature in my method of manufacture consists in pressing or guiding the india-rubber or other substance while in a condition of a plastic sheet or strip in such manner that it will travel along in a circular or similar path, so that the free extremity thereof will return to and be joined with the plastic sheet at any desired point, the said sheet being adapted to be severed at or near that point.

The india-rubber or other substance in a plastic condition may be pressed or guided on a carrier consisting of a cylinder, disk, or the like or of an endless band of canvas or other suitable material adapted to travel along and carry with it the plastic sheet or strip. After the said endless strip or band has been formed it may be readily removed from the carrier. By employing carriers of different dimensions I am able to manufacture endless bands or tubes of any desired size.

In order that my invention may be clearly understood and readily carried into effect, I will describe the same more fully with reference to the accompanying drawings, which illustrate, by way of example, the application of my invention to the manufacture of endless india-rubber bands for wheel-tires.

Figure 2:
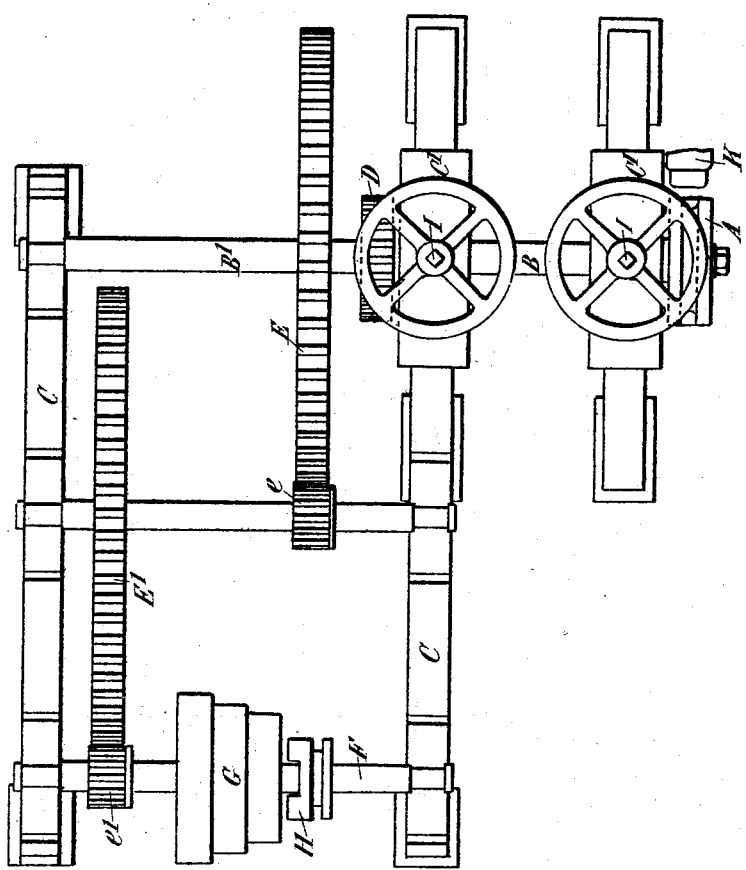
Figure 3:
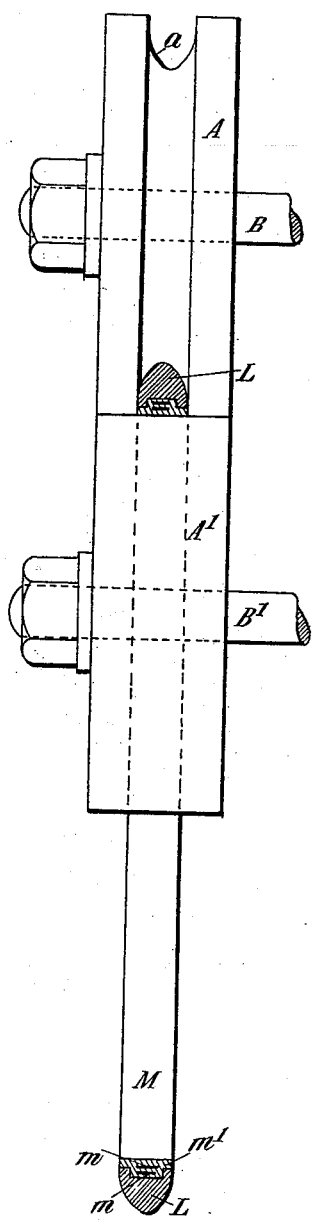

Figure 1 is an elevation, and Fig. 2 a plan, of one form of machine that I may employ for the purpose in view. It is to be understood, however, that I do not limit myself to any of the details of construction of this machine, since it is obvious that there are various ways in which the object of my invention may be effected. Fig. 3 is an enlarged view of the tire between the calendering-rollers, showing the carrier, which in this instance is adapted to remain attached to the tire after formation thereof and to constitute an inextensible base therefor.

A A' are two steel calendering rollers or cylinders, which may be heated by appropriate means. The lower one, A', of these rollers may be covered with suitable material, so as to constitute the above-mentioned carrier; but I prefer to employ a loose flexible carrier mounted on such roller, as shown. These rollers are detachably mounted on shafts B B', carried in sliding bearings working in slots $c$ in the standards C' C' of the framing C. Each of the shafts B B' has mounted upon it a pinion, one only of which, D, is seen in the drawings. These pinions gear with each other and insure that the rollers A A' run at the same surface speed. The lower shaft B' is prolonged and carries the gear-wheel E, by means of which said shaft is rotated.

In the drawings a train of wheels $e'$ E' $e$ E is shown, by means of which the speed of the shaft F, which receives motion from an overhead driving-shaft or otherwise, is reduced to the requisite degree. This arrangement permits of the machine being driven from the same driving-shaft as the india-rubber-forcing machine hereinafter mentioned. Variation of the speed may be obtained in the usual manner by the cone-pulley G, upon which the driving-belt runs.

H is a clutch for enabling the machine to be disconnected from the driving-shaft when desired.

I I are screw-threaded spindles attached at their lower extremities to the bearings of the shaft B and serving both as pressure-screws for forcing the calendering-rollers toward each other during the calendering operation and as lifting-screws for raising the shaft B, so that the endless band may be removed from the rollers. Instead of the shaft B the shaft B' may be adjustable, or both shafts B and B' may be adjustable, if desired.

K is the nozzle of an india-rubber-forcing machine of ordinary construction.

L is the strip of india-rubber which is to form the tire.

M is the endless band constituting the aforesaid carrier.

It is necessary or advisable to employ in conjunction with solid tires of the kind illustrated for use with vehicles an inextensible lining or backing in order to keep such tires from stretching, and in applying the present invention to the manufacture of such tires I prefer to utilize as the carrier the said inextensible lining or backing. For this lining I prefer to employ a band, Fig. 3, having one or more strips of canvas m m, embedded in india-rubber or like substance m', molded or formed to the shape shown. This construction gives a large surface for the tire to adhere to and obviates any tendency to displacement of the tire before it is properly formed. The roller A is provided with a groove a corresponding to the shape of the tire to be formed. The orifice of the nozzle K is of course also of the shape of the india-rubber portion of the tire to be formed—that is to say, in the example under consideration it would be of the shape in cross-section of the india-rubber strip L shown in Fig. 3. Obviously nozzles having orifices of different shapes may be employed, as may also rollers with grooves of different shapes. I may sometimes make the lower roller A' of such a width only as to permit the periphery of the same to enter the groove a to a slight extent. This arrangement permits any desired amount of compression of the tire to be effected in the calendering operation.

The operation of the machine is as follows: The india-rubber is forced or squirted by the forcing-machine in the form of a strip onto the band M between the rollers A A', and, passing between said rollers, is carried along by said band until the extremity of said strip reaches the point where the strip meets the band. The further formation of the india-rubber strip may then be stopped in any suitable manner or the strip may be severed at this point by a suitable cutting device operated by hand or otherwise. The two extremities of the separated portion of the strip (which at this time will meet or lie adjacent to each other) are brought into close contact, so as to be tightly joined or welded together, thereby converting the said strip into an endless band or tire, the joined ends or edges of which will be practically as homogeneous as the other portions thereof. The shaft B is then raised by means of the screws I, so as to withdraw the roller A from the roller A', and the carrier M, together with the endless strip L, is removed and a fresh band placed in position ready to receive the next strip or tire.

If desired, I may provide means whereby the removal of the carrier and its replacement by another will be effected mechanically without having to stop the machine or its output. For instance, I may arrange two or more of the rollers A', carrying the guide-band end to end or side by side, and provide for their being successively brought into position contiguous to the roller from which the plastic sheet or strip is taken.

The manufacture of endless tires or endless covers or treads for pneumatic tires, or of any endless bands, rings, or tubes of india-rubber, can thus be effected in practically as expeditious and cheap a manner as the manufacture of india-rubber sheets.

I may sometimes provide a series of parallel grooves in the roller A instead of only one groove, and provide a corresponding series of orifices in the nozzle K, whereby I am enabled to form several tires or endless strips at the same time.

What I claim is—

1. The method of manufacturing endless bands or tubes herein described, which consists in forcing, while in a plastic condition, the substance employed for forming said bands or tubes, in a stream or strip through a die or nozzle, pressing or calendering the said strip, and at the same time guiding its free end backward and around to a point where it joins the issuing stream or strip, severing the latter at such joint and compressing the material at the joint so formed, as set forth.

2. A method of forming endless bands or tubes of india-rubber consisting in subjecting a stream or strip of india-rubber projected from a forcing-machine to the action of calendering-rollers, and guiding the front extremity of said stream or strip around to meet said stream or strip at or near the point of compression between said rollers, severing the said stream or strip, and pressing the meeting ends of the separated part together to form a homogeneous joint, substantially as specified.

3. A machine for forming bands or strips of plastic material, comprising rollers to receive a strip or sheet of said material, and a carrier to conduct the said strip or sheet along and around until its front extremity meets the strip or sheet, substantially as and for the purposes described.

4. A machine for forming endless bands or strips of plastic material comprising calendering-rollers having surfaces molded to correspond with the shape of the band or strip to be produced, means for rotating said rollers at the same surface speed, and a flexible carrier consisting of an endless strip of suitable material adapted to be mounted on one of said rollers, substantially as and for the purposes described.

In testimony whereof I have hereunto set my hand, in presence of two subscribing witnesses, this 15th day of September, 1898.

JAMES MECREDY MacLULICH.

Witnesses:
H. ASHBY NORRIS,
FRED C. HARRIS.